US006556510B2

(12) United States Patent
Ambs

(10) Patent No.: US 6,556,510 B2
(45) Date of Patent: Apr. 29, 2003

(54) INTEGRATED MARINE SEISMIC SOURCE AND METHOD

(75) Inventor: Loran D. Ambs, Fulshear, TX (US)

(73) Assignee: WesternGeco, L.L.C., Houston, TX (US)

( * ) Notice: Subject to any disclaimer, the term of this patent is extended or adjusted under 35 U.S.C. 154(b) by 150 days.

(21) Appl. No.: 09/727,273

(22) Filed: Nov. 29, 2000

(65) Prior Publication Data

US 2002/0064089 A1 May 30, 2002

(51) Int. Cl.$^7$ ................................................. G01V 1/00
(52) U.S. Cl. ......................................... 367/20; 114/242
(58) Field of Search ..................... 367/20, 17; 114/242

(56) References Cited

U.S. PATENT DOCUMENTS 6,229,760 B1 * 5/2001 Ambs ......................... 367/16

* cited by examiner

*Primary Examiner*—Gregory J. Toatley, Jr.
(74) *Attorney, Agent, or Firm*—David S. Figatner; Streets & Steele

(57) ABSTRACT

A system and method for generating acoustic source energy in marine seismic operations. A plurality of acoustic energy sources are integrated within seismic streamers to facilitate deployment, power distribution and signal communication. The acoustic energy sources can comprise slotted cylinders activatable with piezoelectric elements. By providing an array of lightweight, energy efficient acoustic energy sources throughout a seismic receiver array, both zero-offset and far-offset reflection data can be recorded. The acoustic energy discharge can be swept over a time interval, or steered in a selected pattern throughout the array, to significantly reduce the impulse energy released into the water. The reflected signals can be compressed back into an impulse for subsequent data processing. Bi-static reflections can be generated simultaneously with the zero-offset source-receiver locations to improve the vertical and horizontal resolution of data.

19 Claims, 2 Drawing Sheets

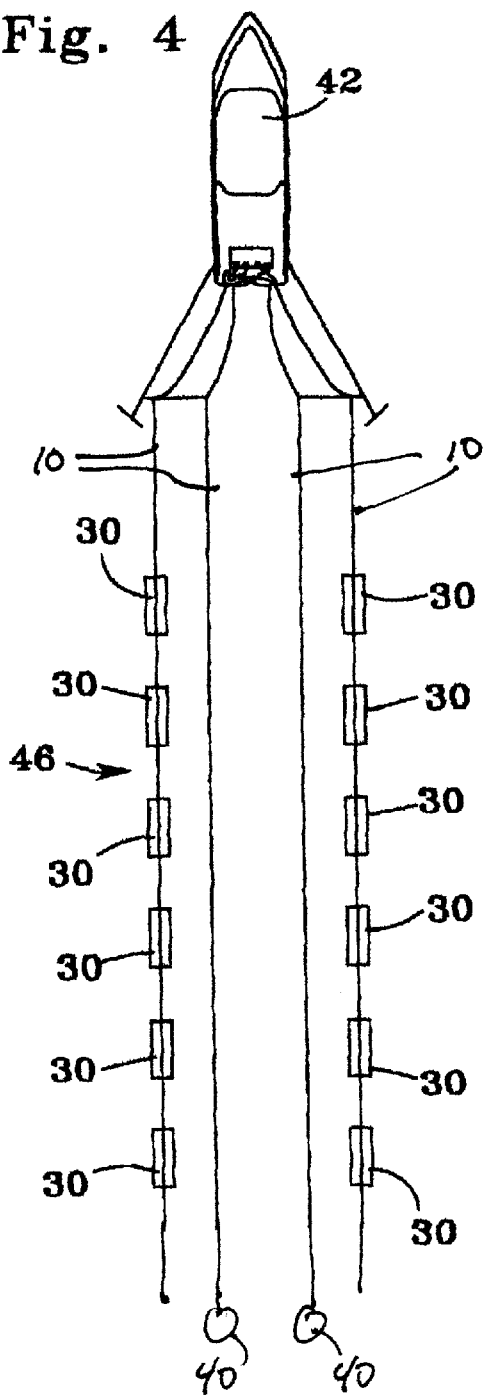
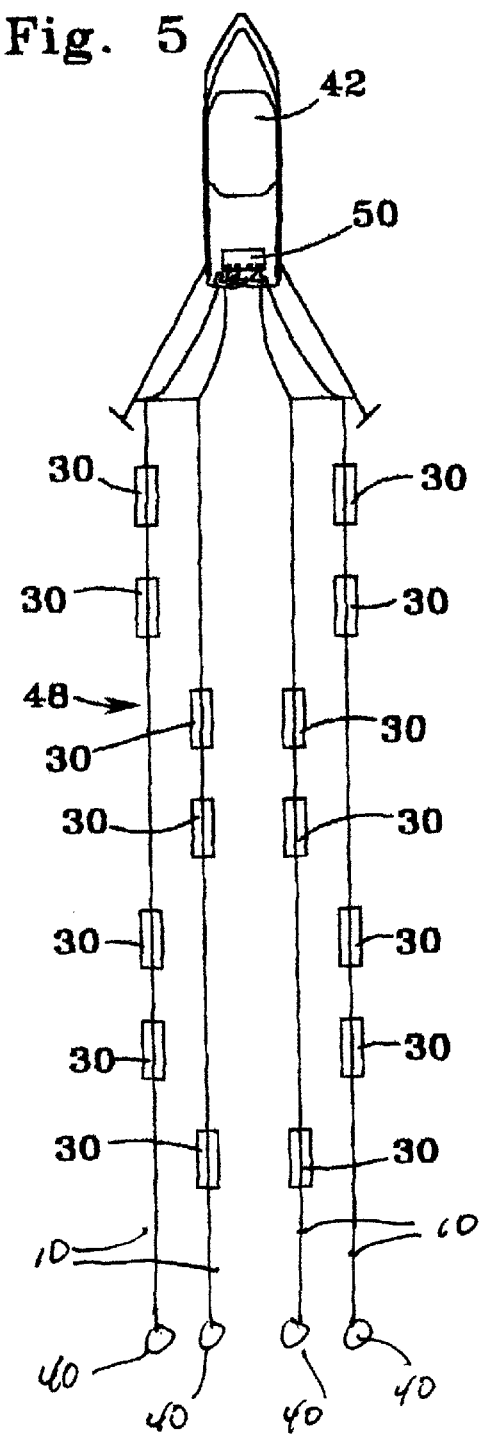

INTEGRATED MARINE SEISMIC SOURCE AND METHOD

BACKGROUND OF THE INVENTION

The present invention relates to the field of geophysical seismic operations for evaluating subsurface geologic formations. More particularly, the invention relates to an integrated marine acoustic energy source and method for discharging source energy into subsurface geologic formations.

Seismic streamer cables are towed in the water behind a marine seismic vessel to detect seismic source energy reflected from geologic features. The vessel tows air guns or other acoustic energy sources to generate energy propagating downwardly through the water and subsurface geologic formations. A portion of the energy is reflected by interfaces between subsurface formations and is detected with hydrophones attached to the streamers. The streamers typically comprise hydrophone strings, internal electrical conductors and control wires, and buoyancy material. Typical streamer cables are three to eight kilometers in length and are towed below the water surface to avoid acoustic noise and vibration generated by surface wave action and other environmental factors.

Various marine vibrators and other acoustic energy sources are used in marine seismic surveys to generate acoustic source energy. Conventional acoustic energy sources are cylindrical, bell-shaped, or spherical in shape and are negatively buoyant in water. The hydrodynamic drag coefficient is high for the acoustic energy sources and for the umbilicals providing compressed air and other support to the acoustic energy sources. It is not uncommon for air-gun sources and associated support equipment to produce more than 20,000 pounds of drag. Accordingly, a seismic vessel expends significant energy in towing conventional systems through the water.

The data detected by receivers such as hydrophones is recorded and processed to provide information about subsurface geologic formations. In an effort to improve seismic signal resolution, various systems use multiple acoustic sources such as air guns in one or more seismic arrays. For example, U.S. Pat. No. 4,727,956 to Huizer (1988) disclosed a method of arranging a plurality of seismic sources in a seismic array having at least two subarrays. The sources were operated to provide a predetermined relation comprising a function of the operating pressure, air gun volume, and tow depth. The seismic source array was modified by changing operating parameters such as the primary-to-bubble ratio and signature shape for the signals.

U.S. Pat. No. 3,953,826 to Brundit et al. (1976) disclosed a means for controlling the streamer cable length in an array having multiple sources and arrays. The multiple arrays were towed in a straight line behind the vessel. In U.S. Pat. No. 4,323,989 to Huckabee (1982), at least two arrays of seismic sources were towed parallel to the other. Steering devices maintained each streamer in the desired lateral position.

Multiple seismic sources require power and control systems for activating the seismic sources. For air gun systems, compressed air hoses and control wires link subsystem components on the seismic vessel to each air gun. One disadvantage of such systems is that the compressed air hoses add weight and tow resistance to a seismic system. Additionally, the discharge of multiple impulsive acoustic energy sources imparts significant acoustic energy to water which interferes with proximate seismic recording operations, and is criticized as having potential environmental ramifications. Accordingly, a need exists for an improved system which effectively generates acoustic source energy in marine seismic operations, reduces hydrodynamic drag, improves signal noise characteristics, and reduces environmental impacts.

SUMMARY OF THE INVENTION

The invention provides a system and method for generating acoustic source seismic energy in water. The system comprises at least two streamers, an electrical conductor within each streamer, and a plurality of housings disposed within each streamer at selected positions along each streamer. A plurality of electrically activatable acoustic energy sources are each engaged with a housing and with an electrical conductor for receiving electric power and for selective operation to generate acoustic source energy in the water, and a controller is engaged with each acoustic energy source for controlling operation of each acoustic energy source.

In different embodiments of the invention, each acoustic source can comprise a slotted cylinder moveable with one or more piezoelectric elements. The controller can be operable to activate the acoustic energy sources in a way to generate acoustic source energy detectable as zero-offset source-receiver locations and is further operable to produce bi-static reflections.

The method of the invention comprises the steps of deploying at least two streamers in the water, wherein each streamer includes an electrical conductor and a plurality of electrically activatable acoustic energy sources integrated within each streamer at selected positions, of providing electricity to each acoustic energy source through the electrical conductor, and of operating the controller to selectively activate at least one acoustic energy source to generate acoustic source energy in the water.

BRIEF DESCRIPTION OF THE DRAWINGS

FIGS. 3 through 5 illustrate different array formations having acoustic energy sources distributed throughout an array.

DESCRIPTION OF THE PREFERRED EMBODIMENTS

Figure 1:
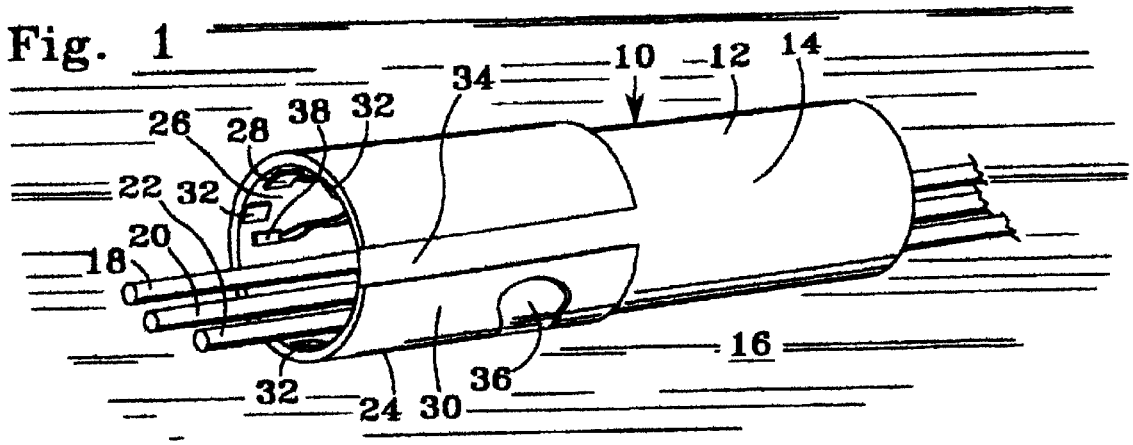
FIG. 1 illustrates an electrically activatable acoustic energy source, such as a slotted cylinder, integrated within a streamer cable.

The invention describes an improved seismic system and method for generating acoustic energy in marine seismic operations. FIG. 1 illustrates marine seismic streamer 10 formed with streamer section 12 having exterior surface 14 in contact with water 16. Streamer 10 can be towed through the water with a seismic vessel or can be deployed as a bottom cable on the ocean floor or other lower end of a water column. Electric power is provided through conductor 18, control wire 20 provides signal transmission capabilities, and telemetry conductor 22 can provide for independent transmission of telemetry information. Although FIG. 1 illustrates three wires or conductors, conventional marine seismic streamers contain multiple wires and conductors. Control wire 20 and telemetry conductor 22 can comprise electrical conductors, fiber optic cables, or other transmission means. In other embodiments, data transmission can be multiplexed through a wire or conductor to provide multiple functions through a single transmission device.

Housing 24 is integrated within streamer section 12 as illustrated and provides an electrically activated acoustic energy source for generating acoustic source energy in water 16. Multiple housings 24 can be integrated within each streamer 10. Such placement permits streamer 10 and housings 24 to be retrieved and wound on a vessel mounted storage reel without requiring removal of housings 24 or other components from streamer section 12. Such orientation also minimizes hydrodynamic drag by integrating housing 24 within substantially the same tow profile as that occupied by streamer section 12 in a preferred embodiment of the invention. This feature of the invention reduces the overall number of components towed through water 16 and significantly reduces tow drag over conventional air gun systems.

Housing 24 provides a platform for generating acoustic source energy in water 16 in the form of a pressure pulse suitable for travel downwardly through subsurface geologic formations, and for reflection from interfaces between subsurface geologic formations. Housing 24 has a substantially hollow center 26 for permitting passage of conductor 18, control wire 20, and telemetry conductor 22 therethrough. Housing 24 also includes controller 28 and slotted cylinder sleeve 30. Sleeve 30 is engaged with one or more piezoelectric elements 32 or other suitable actuation devices which can move sleeve 30 to generate acoustic source energy by momentarily displacing water 16 in contact with sleeve 30. Slot 34 in sleeve 30 is covered with elastic cover 36 to prevent water 16 intrusion into the interior of sleeve 30, and elastic cover 36 can be extended to partially or completely encase sleeve 30. Controller 28 responds to a signal transmitted through control wire 20, and electric power from conductor 18 activates piezoelectric element 32 to displace sleeve 30 to generate acoustic source energy. Pulse operation of piezoelectric element 32 expands and elastically returns sleeve 30 to the original configuration so that water is displaced to generate acoustic source energy.

Optionally, an electric storage device such as capacitor 38 may also be included inside housing 24. This storage device allows electric energy to be accumulated between episodes of acoustic signal generation so that the streamer power load can be relatively uniform over a period of time. Various system improvements can be made to facilitate operation of the invention. Referring to FIG. 1, capacitor 38 can be located within housing 24 to store sufficient energy for each acoustic energy discharge. Alternatively, capacitance capability can be maintained with capacitor banks or other energy storage devices located on a tow vessel. The instantaneous energy provided by the system is low relative to conventional systems, thereby reducing the energy storage requirements of the system.

Piezoelectric element or elements 32 can be attached to an interior or exterior surface of sleeve 30 or can be combined with mechanical or electromechanical devices for magnifying the movement of piezoelectric element 32. Instead of piezoelectric elements, other devices providing the equivalent function of moving slotted sleeve 30 to generate acoustic source energy in water 16 are within the scope of the invention. The pressure pulse in water 16 can be caused by expansion or contraction of sleeve 30, or by other movement of housing 24. Housing 24 can comprise any type of energy source capable of generating acoustic pulse energy in water 16, including transducers formed with slotted cylinders, piezoelectric transducers, Kynar transducers having solid state piezoelectric plastic, or other devices.

In a preferred embodiment of the invention, streamer 10 contains conventional seismic receiving elements with appropriate ancillary hardware and control. Such elements can comprise hydrophones, positioning equipment, and other devices. Hydrophone response to acoustic energy is communicated to a recording system as analog or digital data where it is stored as a function of time and location. The orientation and placement of acoustic source sleeves 30 and hydrophones can be adjusted to accomplish different data acquisition and processing objectives.

Figure 2:
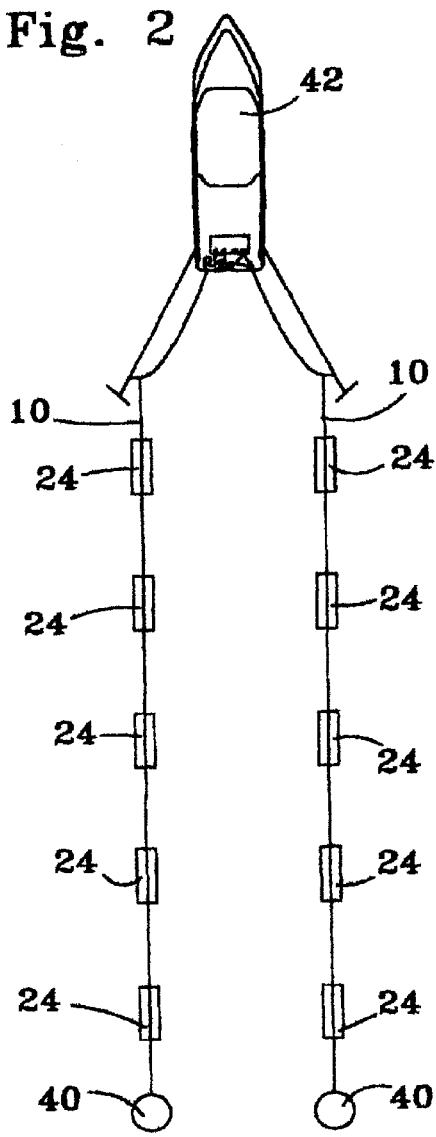
FIG. 2 illustrates a plurality of acoustic energy sources and hydrophones distributed in an array.

FIG. 2 illustrates another embodiment of the invention wherein a plurality of housings 24 and slotted sleeves 30 are engaged with various streamers 10 to form an acoustic source array. Hydrophones 40 detect pressure impulses and generate electrical signals representing such pressure impulses. Vessel 42 tows at least two streamers 10 through water 16, and multiple housings 24 are integrated within each streamer. In one embodiment of the invention, each housing 24 can comprise a connector module for linking adjacent streamer sections 12 into each streamer 10. In a preferred embodiment of the invention, the spacing between each housing 24 in an in-line direction can be the same to eliminate certain data processing variables. In other embodiments of the invention, the cross-line spacing between housings 24 in adjacent streamers 10 can be adjustable to equal the in-line spacing. The invention can provide a uniform grid of seismic sources created by slotted sleeves 30, or can provide different shot placement patterns. A single vessel 42 can be used or multiple vessels 42 can tow one or more streamers 10 in selected paths through water 16.

Figure 3:
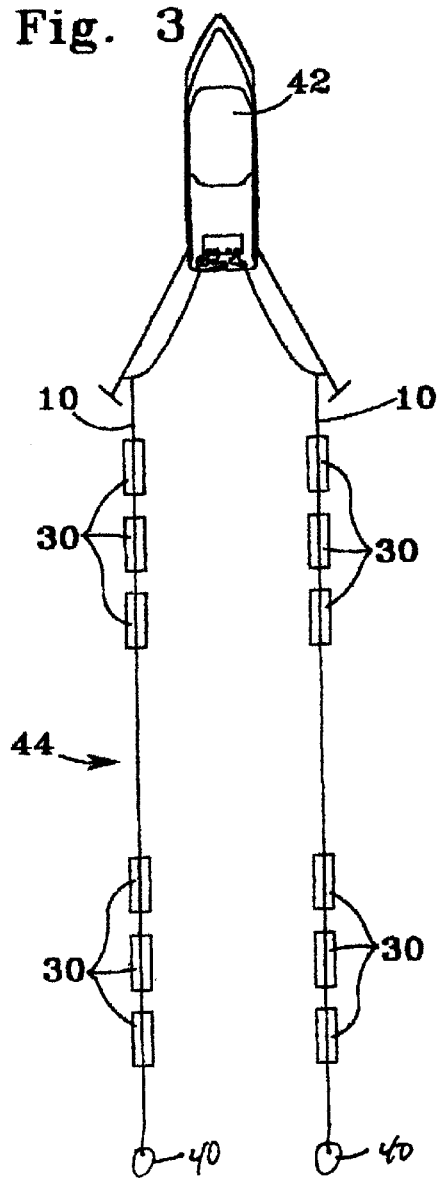

Although the uniform source grid shown in FIG. 2 represents a preferred embodiment of the invention, many other configurations are possible. FIG. 3 shows source sleeves 30 located at the front and back of array 44, FIG. 4 illustrates source sleeves 30 located at opposing sides of array 46, and FIG. 5 illustrates source sleeves 30 in a selected pattern within source array 48. The unique efficiencies provided by source sleeves 30 in combination with selected positioning within a source array 46 provides source energy combinations previously unattainable with conventional source energy technology.

Controller 50 can be positioned on vessel 42 or at another location for selectively controlling the firing pattern for sleeves 30 as a single array or combination of arrays. Referring to FIG. 2, all sleeves 30 can be simultaneously activated to generate acoustic source energy in a planar grid simulating a "blanket" source signal. This feature of the invention generates acoustic source energy detectable as zero-offset (or mono-static) source-receiver locations. Alternatively, controller 50 can operate to produce bi-static (differing source-receiver locations) reflections independently or together with the monostatic data.

Controller 50 can fire sleeves 30 in time domain sweeping of the distributed energy. This feature of the invention permits the acoustic source energy to be discharged over a longer time period so that the environmental impact of the energy is lessened. Alternatively, controller 50 can control sleeve 30 firing in a selected pattern to steer the direction of the acoustic source energy discharged. Such steering function can occur in horizontal or vertical directions to accomplish different shot objectives. The beam pattern of the planar array is characterized by the spatial distribution of the elements, the relative time of energizing individual elements, the relative acoustic power and frequency band of the elements, and other factors.

The invention provides a highly efficient apparatus and system for generating acoustic source energy in water 16.

Bulky, expensive and high maintenance air hoses and compressors are eliminated. Bulky air hoses umbilical between the tow ship and airgun arrays conventionally used are eliminated along with the complex control valves and airgun synchronization hardware. The hydrodynamic drag produced by airguns and airhose umbilicals is eliminated. The time required to launch and recover airgun arrays is eliminated, and the time required to maintain moving parts of airgun arrays is further eliminated. The acoustic sources illustrated as slotted sleeves 30 provide a low profile relative to the cross-section of streamers 10, thereby reducing hydrodynamic drag in the water. In a preferred embodiment of the invention, housing 24 has the same radial diameter as streamer 10. Power and control signals are provided through streamers 10, and the entire streamer with source elements is easily deployed and retrieved mechanically without additional crew handling of an independent source array.

Significantly, slotted sleeves 30 provide an efficient, variable frequency and acoustic power means for discharging acoustic source energy into water 16. By converting electric power into elastic mechanical movement, the energy transfer efficiency is maximized and energy discharge is controllable within a relatively tight range of parameters. This reduced power requirement substantially lessens the amount of energy discharge required, minimizing the impact on environmental factors and on other, contemporaneous seismic operations.

The instantaneous acoustic pressure required at the target is the sum of pressures produced by source elements. Therefore, the instantaneous pressure required of each source element is reduced by the number of elements employed in the arrays. If the desired acoustic pressure (normalized for range) from a single element point source is 200 dB/Hz re micro Pascal in a particular frequency band, then each element of an array of one hundred elements would necessitate a pressure of 160 dB/Hz for the same frequencies. If these array elements are formed into a planar array, the instantaneous acoustic pressure measured near the array is much less than that produced by an equivalent point source and therefore much less damaging to the environment. Another advantage of multiple array elements is the reduction of source generated "noise", defined as undesired acoustic energy produced by the sources. Noise is reduced by the square root of the number of array elements, and an array formed with one hundred elements will produce only ten percent of the undesirable noise produced by a single element having the same acoustic performance.

If the time of signal generation is appropriately controlled, the acoustic energy may be steered in a desired azimuth and elevation angles to focus the energy in a desired direction. The unique combination of elements identified herein significantly facilitates steering of the acoustic energy generated.

Another significant advantage provided by the plurality of slotted sleeves is the capability to generate a "swept" acoustic source signal. Spreading the acoustic generation in time and frequency band further reduces the instantaneous pressure realized by the environment nearby the source array elements. Controller 50 can selectively manage the power provided to activate each sleeve 30, thereby providing lower or higher acoustic energy discharges as desired. The entire array of all sleeves 30 can be discharged at a relatively low energy level as a blanket energy discharge, and the resulting reflections can be detected. The amplitudes of a broadband SINC function (similar to a narrow impulse) and a chirp signal are related with the proportionality factor:

$$[TW/2]^{1/2}$$

where T is the duration of the chirp; and

W is the chirp bandwidth (negative and positive frequency components).

Matched-filter processing of chirp signal compresses the energy spread in time and frequency to produce a SINC function of high amplitude and narrow width. A chirp signal having a duration of five seconds with start frequency of 5 Hz and end frequency of 120 Hz requires about four percent the instantaneous pressure of a SINC function having the same bandwidth after matched-filter processing of the chirp. Following detection by hydrophones 40, the detected data can be compressed back into an equivalent impulse data signal by matched filter processing (correlation). The source signal can be swept within each sleeve 30 or other substitute acoustic source element, can be swept from one side of the array to another, or can be generated in a selected pattern within the array.

Matched filter signal processing facilitates generation of a variety of signal types and characteristics. For instance, multiple source signals having no cross-correlation (orthogonal) may be generated synchronously (or asynchronously) by sub-arrays of source elements such as those formed at opposite sides or ends of streamer arrays.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A system for generating acoustic source seismic energy for exploring geologic formations underlying water, comprising:

at least two streamers;

an electrical conductor within each streamer;

a plurality of housings disposed within each streamer at selected positions along each streamer;

a plurality of electrically activatable acoustic energy sources each engaged with a housing and with an electrical conductor for receiving electric power and for selective operation to generate acoustic source energy in the water; and a controller engaged with each acoustic energy source for controlling operation of each acoustic energy source.

2. A system as recited in claim 1, wherein each acoustic energy source comprises a slotted cylinder.

3. A system as recited in claim 2, wherein each slotted cylinder is moveable by one or more piezoelectric elements.

4. A system as recited in claim 2, wherein said controller is capable of selectively operating an acoustic energy source at one end of a streamer.

5. A system as recited in claim 4, wherein said controller is capable of operating a plurality of acoustic energy sources to generate acoustic source energy detectable as substantially zero-offset source-receiver locations, and wherein said controller is capable of operating at least one acoustic energy source at a distance from said acoustic energy receivers to produce bi-static reflections.

6. A system as recited in claim 1, wherein said controller is capable of time domain sweeping operation of said acoustic energy sources.

7. A system as recited in claim 1, wherein said controller is capable of steering the acoustic source energy by operating said acoustic energy sources in a selected sequence.

8. A system for generating acoustic source seismic energy for exploring geologic formations underlying water, comprising:

- at least two streamers;
- an electrical conductor within each streamer;
- a plurality of slotted cylinders positioned at selected positions along each streamer;
- one or more piezoelectric elements each engaged with a slotted cylinder for receiving electric power from an electrical conductor and for selectively moving the corresponding slotted cylinder to generate acoustic source energy in the water; and
- a controller engaged with said piezoelectric elements for controlling movement of said slotted cylinders to generate the acoustic source energy.

9. A system as recited in claim 8, wherein each slotted cylinder is integrated within a streamer.

10. A system as recited in claim 8, wherein said controller is engaged with said piezoelectric elements through one or more electrical conductors.

11. A system as recited in claim 8, wherein said controller is capable of simultaneously activating each of said piezoelectric elements to generate the acoustic source energy.

12. A method for generating acoustic source seismic energy in water, comprising the steps of:

- deploying at least two streamers in the water, wherein each streamer includes an electrical conductor and a plurality of electrically activatable acoustic energy sources integrated within each streamer at selected positions;
- providing electricity to each acoustic energy source through an electrical conductor; and
- operating said controller to selectively activate at least one acoustic energy source to generate acoustic source energy in the water, wherein the acoust energy sources each comprise a slotted cylinder activated by one or more piezoelectric elements.

13. A method as recited in claim 12, wherein said controller activates a plurality of acoustic energy sources to generate acoustic source energy detectable as zero-offset source-receiver locations.

14. A method as recited in claim 13, wherein said controller activates at least one acoustic energy source distal from said plurality of acoustic energy receivers to produce bi-static reflections.

15. A method as recited in claim 14, further comprising the step of operating at least one receiver to detect said zero-offset seismic data and to detect said bi-static reflections.

16. A method as recited in claim 15, further comprising the step of recording said zero-offset data and said bi-static reflections.

17. A method as recited in claim 16, further comprising the step of processing said zero-offset seismic data and said bi-static reflections.

18. A method as recited in claim 12, further comprising the step of operating said controller for time domain sweep operation of said piezoelectric elements and engaged acoustic energy sources.

19. A method as recited in claim 18, further comprising the step of operating said controller to selectively activate said piezoelectric elements for steering generation of the acoustic source energy.

* * * * *